Aug. 28, 1923.
C. WATSON
ROPE COUPLING
Filed March 28, 1922
1,466,495
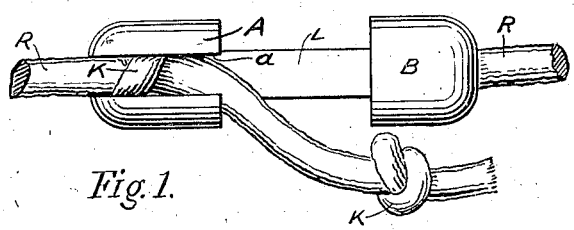
Fig. 1.
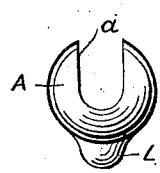 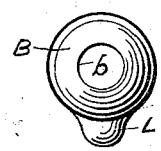
Fig. 2. Fig. 3.
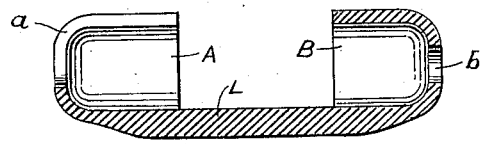
Fig. 4.
Witnesses
INVENTOR.
Charles Watson
BY
ATTORNEY Patented Aug. 28, 1923.

1,466,495

UNITED STATES PATENT OFFICE.

CHARLES WATSON, OF NEW YORK, N. Y.

ROPE COUPLING.

Application filed March 28, 1922. Serial No. 547,558.

*To all whom it may concern:*

Be it known that I, CHARLES WATSON, a citizen of the United States, and resident of the city, county, and State of New York, have invented certain new and useful Improvements in Rope Couplings, of which the following is a specification.

This invention consists of a coupling for ropes and has for its objects the production of such a device, formed without any projections or hooks, and capable of being readily seized in the hand for quick manipulation.

In the accompanying drawings, which show my invention,

Fig. 1 is a top view of the coupling.

Fig. 2 is an end view of Fig. 1 showing slotted socket.

Fig. 3 is a view of the other end, showing annular socket, and

Fig. 4 is a central longitudinal sectional view.

The coupling is preferably cast of one piece, and when neatly done requires no machining. The end, A, is a hollow socket provided with a longitudinal slot, $a$, for the passage of the removable or free end of the rope, R; the other end of the coupling has a hollow socket, B, provided with a round opening, $b$, through which (what I call) the fixed end of the rope is passed and secured in place by a knot. These two sockets are connected by a link, L; K are knots in the rope.

Such being the construction, the operation is as follows:—The end of a rope is passed through the opening in the socket, B, and a knot tied in it. When the rope is pulled upon, the knot is drawn into the hollow space. The other or free end of the rope may have a series of knots tied therein at predetermined distances.

To couple up rope, or connect the ends, the free end is pushed down through the slot, A, of the socket A, and when drawn upon, the knot will be forced into the hollow space where the tension on the rope holds it.

To unfasten, the coupling is held in the hand and the free end of the rope is pulled upon until the knot leaves the socket and the rope pulled out through the slot. For heavy loads, or when it is desired to have the rope slack and remain so for any length of time, (as on a wash-line, for instance,) a bight may be taken between the two ends, over the link, to act like on a cleat.

Such being my invention what I claim as new is:—

1. A coupling for ropes, comprising a bar with a perforated cup at one end adapted to contain the knotted end of a rope and a slotted cup at the other end into which a knotted end of a rope may be inserted and retained.

2. A coupling for ropes comprising cup-shaped ends, one of the ends being perforated for the passage of a rope and adapted to conceal a knot at the end of the rope and the other end having a slot into which the end of a rope may be inserted while its knotted end is adapted to be contained in the other end, the two cup-shaped ends being united by a bar.

3. A coupling for ropes comprising a bar, a perforated cup-shaped end through which a rope may be passed and a knot at its end contained and concealed in said cup-shaped end, and an oppositely disposed cup-shaped end having a slot in its upper side into which a rope is adapted to be passed and a knot drawn into and held by the said latter cup-shaped end.

Signed at New York city, in the county and State of New York, this 25th day of March, A. D. 1922.

CHARLES WATSON.